United States Patent [19]
Yu

[11] Patent Number: 6,085,986
[45] Date of Patent: *Jul. 11, 2000

[54] OSCILLATING DISK DRIVES

[76] Inventor: Michael Yu, 1270 Shakespeare Dr., Concord, Calif. 94521

[*] Notice: This patent is subject to a terminal disclaimer.

[21] Appl. No.: 09/013,477

[22] Filed: Jan. 26, 1998

Related U.S. Application Data

[63] Continuation-in-part of application No. 08/517,915, Aug. 22, 1995, Pat. No. 5,711,482, which is a continuation-in-part of application No. 08/238,063, May 3, 1994, abandoned.

[51] Int. Cl.⁷ .................................................. B05B 15/02
[52] U.S. Cl. .............................. 239/1; 239/104; 239/542; 239/570; 239/112
[58] Field of Search .............................. 239/542, 533.13, 239/570, 435, 589.1, 1, 106, 112, 104

[56] References Cited

U.S. PATENT DOCUMENTS

| | | | |
|---|---|---|---|
| 2,554,790 | 5/1951 | Miller | 138/43 |
| 3,273,803 | 9/1966 | Crowley | 239/457 |
| 3,777,980 | 12/1973 | Allport | 239/272 |
| 3,780,946 | 12/1973 | Smith et al. | 239/242 X |
| 4,077,569 | 3/1978 | Deines | 239/101 |
| 4,226,368 | 10/1980 | Hunter | 239/542 |
| 4,366,929 | 1/1983 | Bron | 239/542 |
| 4,660,769 | 4/1987 | Rosenberg | 239/542 |
| 4,718,608 | 1/1988 | Mehoudar | 239/542 |
| 5,197,638 | 3/1993 | Wood | 239/510 X |
| 5,279,462 | 1/1994 | Mehoudar | 239/542 |
| 5,294,058 | 3/1994 | Einav | 239/533.1 |
| 5,295,506 | 3/1994 | Smith | 137/271 |
| 5,413,282 | 5/1995 | Boswell | 239/542 |
| 5,711,482 | 1/1998 | Yu | 239/11 |

FOREIGN PATENT DOCUMENTS

| | | | |
|---|---|---|---|
| 2 378 44 | 8/1978 | France . | |
| 2614557 | 11/1988 | France | 239/542 |
| 935011 | 6/1982 | Russian Federation | 239/542 |
| 1607747 | 11/1990 | Russian Federation | 239/542 |
| 1191027 | 11/1985 | U.S.S.R. | 239/542 |
| 1509002 | 9/1989 | U.S.S.R. | 239/542 |
| 2187821 | 9/1940 | United Kingdom | 239/540 |
| 2 009 573 | 6/1979 | United Kingdom . | |
| 8402828 | 8/1984 | WIPO | 239/542 |

*Primary Examiner*—Kevin Weldon
*Attorney, Agent, or Firm*—Baker Botts L.L.P.

[57] ABSTRACT

Oscillating disk devices for drip irrigation systems, heap leach mining systems, industrial cleaning high pressure washer or emulsifying systems are provided. The devices include an upper body portion having an inlet defining an intake passageway and a lower body portion having a discharge outlet defining a discharge opening and passageway. A disk (or disk combined with a spring) is positioned in a chamber between the upper and lower body portions. During the oscillation cycle, the disk oscillates with great energy at a low to medium frequency. This mechanical oscillation may be used to flush out irrigation or heap leach mining drippers and lines, and to create shock waves or mechanical vibrations that can be used for industrial cleaning applications, increase efficiency of high pressure water and mix or emulsify solutions.

21 Claims, 4 Drawing Sheets

OSCILLATING DISK DRIVES

RELATED APPLICATIONS

This application is a continuation-in-part application of U.S. application Ser. No. 08/517,915 filed on Aug. 22, 1995 now U.S. Pat. No. 5,711,482, entitled *Resilient Disk Drip Irrigation Devices*, issued on Jan. 27, 1998 to Michael Yu, which is a continuation-in-part of U.S. application Ser. No. 08/238,063, filed May 3, 1994 now abandoned, and entitled *Resilient Disk Drip Irrigation Devices* by Michael Yu, now abandoned.

TECHNICAL FIELD OF THE INVENTION

This invention relates in general to the field of liquid delivery systems. More particularly, the present invention relates to oscillating disk devices including a pressure-compensated self cleaning dripper and an automatic end flush for agriculture, industrial and solution mining applications.

BACKGROUND OF THE INVENTION

In the field of irrigation systems, the drip system has become one of the most widely used water delivery methods. In conventional drip irrigation systems, water is carried in drip hoses generally along rows of plantings. At the location of each plant, a dripper or drip head is inserted into the hose to form a conduit. The generally hollow dripper thus allows water to flow into the dripper and dispense the water one drip at a time. However, due to the relatively small discharge volume of the dripper, its water delivery passage and openings are prone to obstruction by sand, soil, debris, mineral deposits, algae and bacterial matter that have accumulated in the system. The concentration of foreign matter is the greatest at the start of each irrigation cycle due to accumulation between cycles when there is no water flow through the system. In addition, since a drip line has many valleys, bacteria and algae grows in the water accumulated in the valleys. The farm or orchard operator must therefore examine each dripper periodically to ensure each is function properly. If a plugged dripper is found, it must be removed from the hose to be cleaned or replaced. It is obvious that this an extremely time consuming process since a typical farming operation or orchard may use thousands of such drippers in its irrigation system.

In the field of mining, drippers are used in heap leach applications to deliver the heap leach solution, such as cyanide or sulfuric acid, to the mined rock pile. Conventional drippers used in the heap leach mining applications suffers from the serious drawback of clogging after very short periods of operation due to the heavy mineral content of the heap leach solution. Further, most conventional drippers are not capable of draining the water from the hose after the pump or valves are shut off. Because most conventional drippers have labyrinthine passageways and water surface tension, they require some pressure to force the remaining water out of the hoses. This presents a problem in freezing climates.

In the field of industrial cleaning, ultrasound has been the method of choice for cleaning fine and small parts. Because ultrasound causes vibrations of over 40,000 cycles per second of very short wavelengths, the energy can only be used in small tanks with solvents.

Some drippers in the market provide flushing capabilities, but they use many times more water during static flushing in comparison with the drip cycle. Therefore, these systems require an irrigation system with greater capacity and pipe sizes and a large amount of water in a short time, it is expensive, unfeasible and some times impossible when well water is used.

Accordingly, there is a substantial need for a device that provides for automatic flushing of particles and drainage of water from the system to prevent obstruction of water delivery and dispensing. There is a further need for a dripper that facilitates the flushing and unplugging automatically without manually checking the dripper devices and lines in the field.

SUMMARY OF THE INVENTION

In accordance with the present invention, resilient disk drip devices are provided which substantially eliminate or reduce disadvantages and problems associated with prior systems.

In one aspect of the present invention, oscillating disk devices for drip irrigation systems, heap leach mining systems, industrial cleaning or emulsifying systems are provided. The devices include an upper body portion having an inlet defining an intake passageway and a lower body portion having a discharge outlet defining a discharge opening and passageway. A disk is positioned in a chamber between the upper and lower body portions. During the oscillation cycle, the disk oscillates with great energy at a low to medium frequency. This mechanical oscillation may be used to flush out irrigation or heap leach mining drippers and lines, and to create shock waves or mechanical vibrations that can be used for industrial cleaning applications, and mix or emulsify solutions.

An important technical advantage of the present invention is the substantial reduction of the required water flow to flush out the system of foreign matter and automatically drain the system of residual water. In addition, the individual dripper heads may be cleaned and flushed without detaching them from the irrigation hoses, a step that contributes to the aging and weakening of the hoses.

Another important technical advantage of the present invention is the application of the mechanical oscillatory motion of the disk (or disk reinforced by a spring) to industrial cleaning applications, and solution mixing or emulsifying applications. This oscillatory motion is easy to achieve and does not require a large amount of energy expenditure.

By using the oscillating disk device of the present invention, the vibration wavelength is much longer, and the amount of cycles per second is controllable in comparison with ultrasonic. This results in greater cleaning power that can be used in larger containers. Solvents are no longer required and can be replaced by detergent which is better for the environment.

BRIEF DESCRIPTION OF THE DRAWINGS

For a better understanding of the present invention, reference may be made to the accompanying drawings, in which.

DETAILED DESCRIPTION OF THE INVENTION

Figure 1:
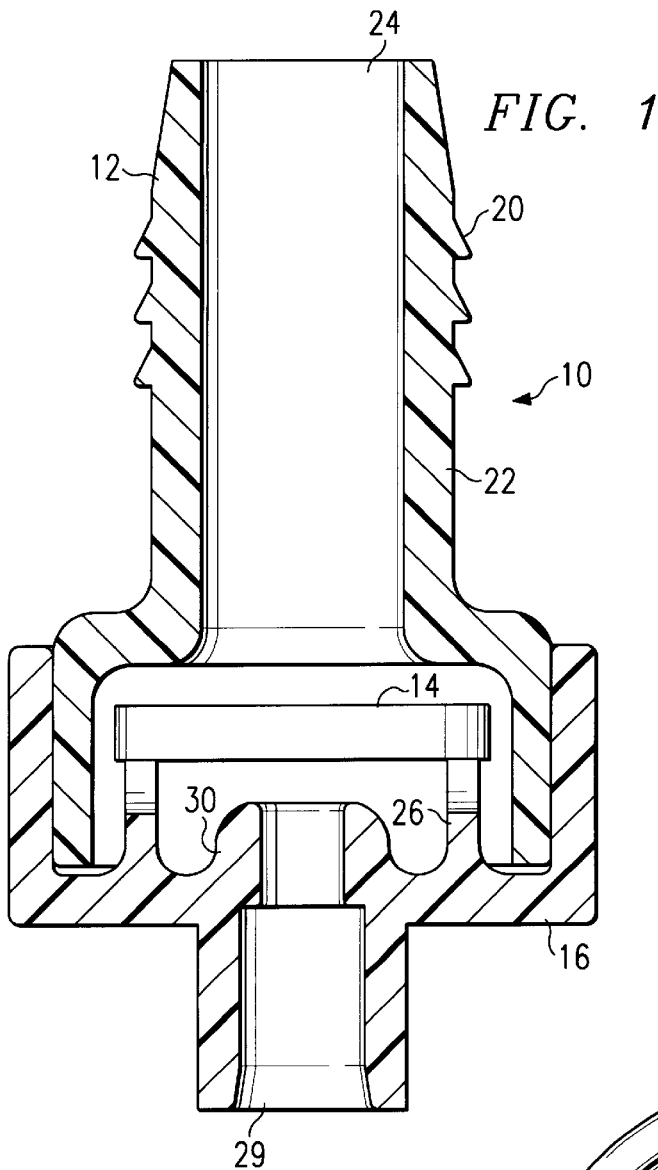
FIG. 1 is a cross-sectional side view of an embodiment of a drip line end flush device according to the teachings of the present invention.

Referring to FIG. 1, a cross-sectional view of a drip line end flush 10 is shown. The drip line end flush 10 includes three main body parts: an upper body portion 12, a resilient disk 14, and a lower body portion 16. The upper body portion 12 connects drip line end flush 10 to the end of an irrigation line (not shown). It includes one or more hose barbs 20 which provides a tight fit with the hose to prevent the disengagement of the device 10 and leakage of water. Barbs 20 may include individual ridges or circumvent the upper body portion 12 or a combination of both. Upper body portion 12 further includes a long neck 22 forming a water intake passageway 24. The long neck 22 allows insertion into the end of an irrigation line and the use of a hose clamp (not shown), if desired, to securely fasten it thereto. Upper and lower body portions 12 and 16 may be constructed of ABS, high density polypropylene, high density polyethylene, and other suitable materials.

The disk 14 may be constructed from flexible and resilient materials such as natural latex, EPDM, VITON, silicone, and any other material or combinations of materials of similar property or characteristics. The upper body portion 12 is assembled and adhered to the lower body portion 16 with the resilient disk 14 positioned therebetween perpendicular to the path of intake and discharge water flow as shown in FIG. 1. A glue, suitable cement, or other bonding agents may be used. Ultrasound welding, threaded fitting, or press-fitting may also be used to securely attach the two body portions 12 and 16.

Figure 2:
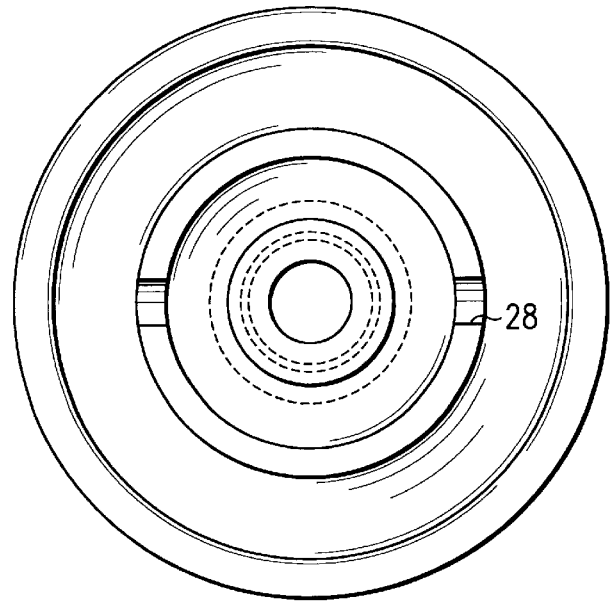
FIG. 2 is a cross-sectional top view of the lower body portion of the drip line end flush.

The lower body portion 16 includes a circular support column 26 on which the disk 14 sits. Referring also to FIG. 2, one or more slots 28 are formed in the circular support structure or column 26 to form a water-admitting passageway. This passageway permits the passage of water to a discharge opening 29. A single square slot will have a much larger opening to permit accumulated debris to discharge with water. The discharge passageway 29 is formed in the lower body portion 16 to provide the flushing of debris out of the irrigation line. Positioned at the opening of discharge passageway 29 is a discharge sealing ring 30. Note that the combined opening size of the slot or slots 28 is less than the size of either the intake passageway 24 or the discharge opening 29.

In operation, the apparatus has three operating modes: static discharge, disk oscillation, and drip. The resilient disk 14 behaves much like a plunger during the oscillation mode, and like a pressure regulator during the drip mode to automatically regulates the flow depending on the water pressure. The static discharge mode takes place at the beginning of each operating cycle, when water enters and flows through the irrigation lines. At a predetermined water pressure, the resilient disk 14 begins to oscillate to further force out debris accumulated in the lines and the drippers. Debris and other accumulated matter are pushed to the end of the line and are freely discharged by the drip line end flush 10 through slot(s) 28 and discharge passageway 29.

As the water pressure increases, reaches and then exceeds a predetermined setting, for example 4 psi, the resilient disk 14 is pushed against the discharge sealing ring 30 thus effectively shutting off the water flow to the discharge opening 29. The oscillation mode is completed and the drip mode begins. During the drip mode, water droplets are discharged by the drippers in a pressure-compensated manner to the desired locations such as crop root zones or the heap leach pad. At the end of the drip mode (after the pump shuts off), the water pressure drops to oscillating parameters and the resilient disk begins oscillation once again. After the water pressure drops below the oscillation parameters, the resilient disk 14 returns to its original shape and position. Water still remaining in the irrigation lines may then be drained through the slot openings 28 and discharge opening 29.

In the irrigation field, hundreds of the end flush 10 may be used in an irrigation system to prevent too much water from being discharged at the beginning of each drip cycle and overload the system. The present invention the end flush device 10, can control the slot 28 opening size to regulate the discharge volume, for example a 2.5 by 2.5 millimeter square slot will flush less than 5 gallons of water per hour during the initial irrigation. And the size 2.5 by 2.5 millimeter opening size generally is many times larger than the dripper's design, which allows larger accumulated debris to go through. In reality, the end flush also works like an air vent, inviting the pressurized water to rush toward the end flush. More importantly, during end of the irrigation it will slowly (less than 5 gallons per hour) drain out all the water. Slow draining is also quite important because it lessens the chance of a hole being blasted in the field.

The drip line end flush 10 may also employ a stationary disk 14 in place of the floating disk 14. The stationary disk 14 is positioned similarly but is attached to the supporting structure 26 at its perimeter. Mounted in this manner, the free center areas of the stationary disk 14 is able to move towards discharge sealing ring 30 at water pressures in a predetermined range and shutting off water flow through the device 10. Before the resilient disk 14 seals the discharge sealing ring 30, it creates a short burst of oscillation. This helps to clean out debris that may stick to the ridge of the discharge sealing ring 30 and cause leakage. The principle of the oscillation is the same, but some configurations may be different between the dripper and the end flush in order to accomplish different purposes and results. For example, the end flush 10 has an outer disk support column 26, which enables the end flush 10 to have a much larger slot opening 28 than the hole 60 opening in the resilient disk 44 of the dripper 40 (FIGS. 3 and 4) to permit accumulated debris to discharge with the water. The parameter of performance, such as oscillation rate and at what pressure the discharge sealing ring 30 is sealed and reopened, can be controlled in the same manner as the dripper 40 design, which is explained below.

Figure 3:
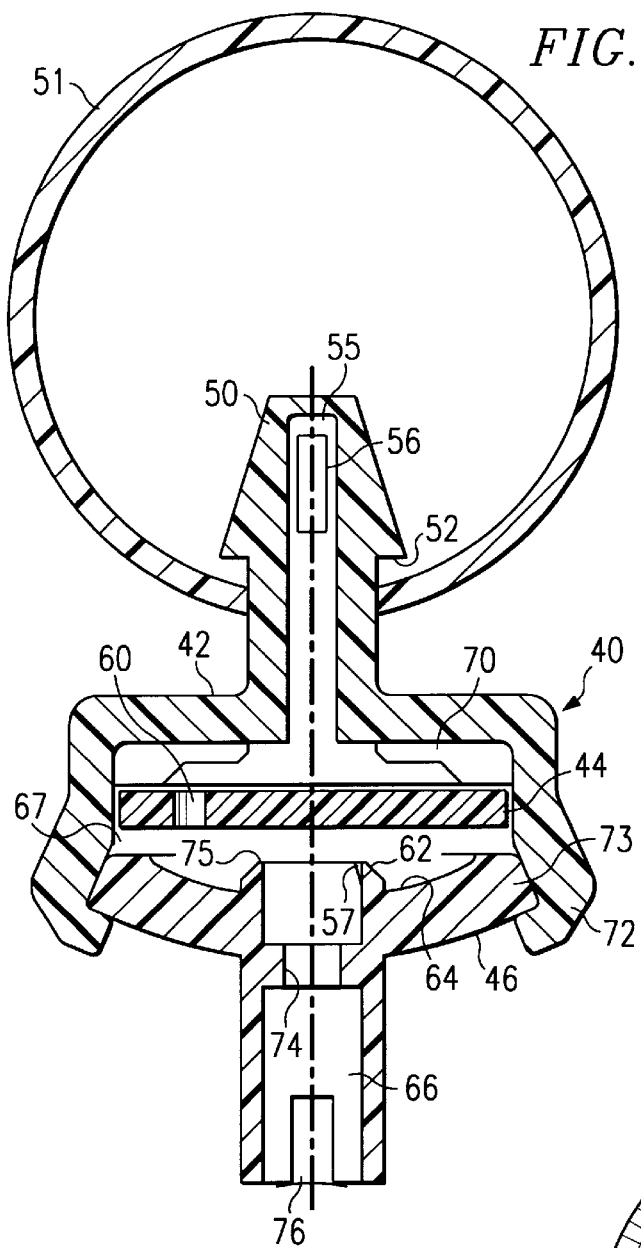
FIG. 3 is a cross-sectional side view of a preferred embodiment of a floating disk dripper.

Referring to FIG. 3, a cross-sectional view of a floating disk dripper 40 is shown. The floating disk dripper 40 includes an upper body portion 42, a floating disk 44, and a lower body portion 46. The upper body portion 42 includes a piercing head 50 that may be inserted into a pre-drilled opening on the side of a drip hose 51. The piercing head 50 includes an anchoring barb or flange structure or anchor 52 which securely anchors against the inner wall of the hose 51 to prevent the dislodging of the dripper 40 by mounting water pressure. The piercing head 50 further forms an intake passageway 55 which channels the water or other solutions (for solution mining) from the hose 51 into the dripper 40.

At least two outlets 56 are formed in the side of the water passageway 55 to allow water to enter into the passageway 55. The upper body portion 42 further houses the floating disk 44, which is positioned substantially perpendicularly to the intake passageway 55 in the cavity or chamber formed between the upper and lower body portions 42 and 46. The upper and lower body portions 42 and 46 may be constructed of Acetal (or DELREN manufactured by Dupont) or suitable materials with memory.

Figure 5:
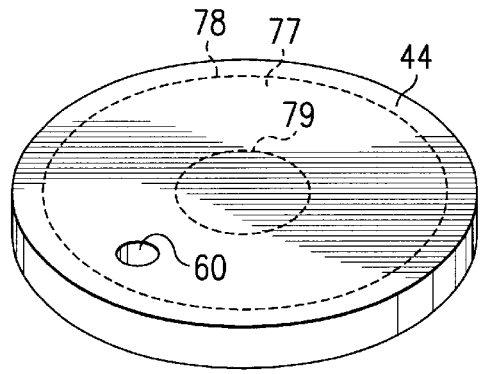
FIG. 5 is a elevational view of the floating disk.

The floating disk 44 is also constructed of a flexible and resilient material which also should be chemical resistant such as natural latex, a polybutadiene compound, EPDM, Viton, silicone, and any other material of similar property or characteristics. The disk may also be constructed of metals or metal compounds for certain applications where strong oscillation is desired such as for industrial cleaning. Referring also to FIG. 5, it may be seen that one or more openings 60 (a single hole opening is preferred to allow larger debris to pass through) are formed in the floating disk 44 a predetermined distance from the perimeter to permit the passage of water from the upper body portion 42 to the lower body portion 46. A wet surface area 77 is further defined on the disk 44. The wet surface area 77 is defined as the surface area between two concentric circles 78 and 79 projected thereon by the supporting outer ring 67 and the discharge sealing ring ridge 75, respectively. When the disk 44 is pushed against the discharge sealing ring ridge 75 and the supporting outer ring 67, and the floating disk 44 almost seals the discharge 66, at this split second, the water pressure at the discharge side is no longer at atmospheric pressure. The wet surface area at the discharge side has the same water pressure as the intake side, because the same pool of water connects the intake and discharge sides through the opening 60 on the disk.

The lower body portion 46 forms a discharge sealing ring 62 at the opening of a discharge passageway and opening 66. The discharge sealing ring 62 further defines a narrow ridge 75. The floating disk 44 is positioned in a cavity formed by a reinforcing structure 70 defined by the upper body portion 42 and a supporting structure 73 defined by the lower body portion 46. The supporting structure 73 further defines a supporting outer ring 67, which is the highest point when measured from the discharge sealing ring ridge 75. In this floating position, the disk 44 is spaced from the discharge sealing ring 62 and the discharge passageway 66 is unobstructed. It may be seen that a stationary disk 44 may also be employed to produce substantially the same function. Such a disk may be mounted and bonded to the supporting structure 73 at its outer perimeter. Supporting structure 73 may be pressed to fit within a clamping structure 72 formed in the upper body portion 42.

Figure 4:
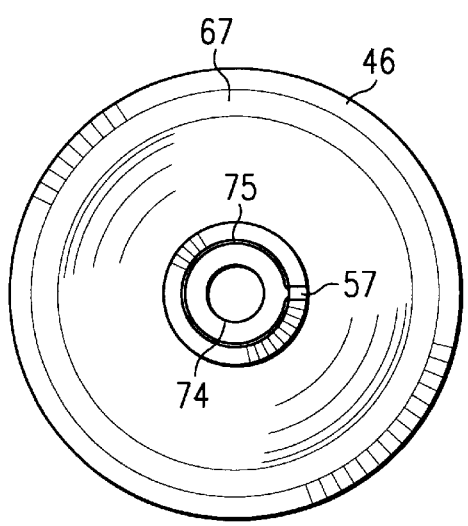
FIG. 4 is a top view of a portion the floating disk dripper.
Figure 6:
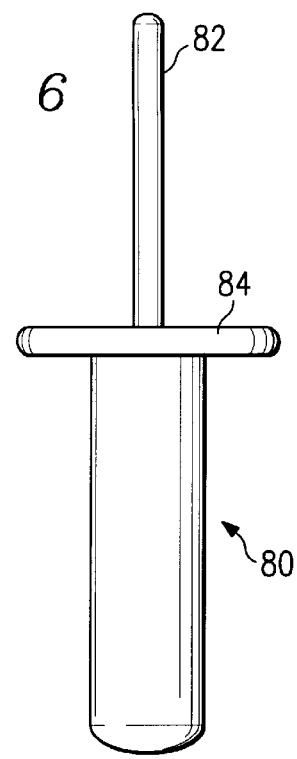
FIG. 6 is a side view of a tool used with the floating disk dripper.

Referring also to FIG. 4 for a top view of the lower body portion 46, along the inner perimeter of discharge sealing ring 62, a minute slot 57 is formed. Slot 57 permits a small amount of water to escape to the discharge passageway 66 when the discharge opening is substantially obstructed by the floating disk 44. A deflector ring 74 is further formed in the discharge passageway 66 to form droplets of water or solution from the small stream of mist-like high velocity water escaping through the slot 57. The principal is to change the directional small stream of water (mist) to a pool of turbulent water before it passes through the deflector ring 74. In this way, most of the energy is dissipated. After passing the deflector ring 74, the opening size once again is enlarged, which also contributes to absorbing the excess energy from the discharge water. To condense the high velocity mist to water drops is a very important part of the design. If this is not achieved, the dripper has no practical usage, the discharge mist will shoot distance away from designated plant to be watered, and most of the water will turn into vapor or be carried away by the wind. Today most drippers use pressure reducing principals, which guide the water through a labyrinthine path and drastically reduce water pressure before it reaches discharge. Even at low discharge pressure a cap over the discharge or a shield build in the discharge has often been used. The functions of these structures will be apparent from the description of the operation of the float disk dripper device 40. The stopper-flushing tool 80, as shown in FIG. 6, is provided to facilitate the flushing of the dripper 40, the function of which is described in more detail below.

In operation, the piercing head 50 of the floating disk dripper 40 is inserted into a pre-drilled opening of appropriate size in a drip irrigation hose 51. The dripper 40 is then firmly anchored in place by the anchor 52. To facilitate the description of the operation of the dripper 40, the side of the disk 44 facing the upper body portion 42 is the "intake side" and the other side facing the lower body portion 46 is the "discharge side."

During beginning of each operating cycle, water or a solution enters the hose and the dripper 40 through the intake passageway 55. The initial water pressure pushes the floating disk 44 against the supporting outer ring 67 and positioned spaced from discharge sealing ring 62. Water thus flows freely through the one or more openings 60 in the disk 44 and exits through the discharge passageway and opening 66. Some debris and foreign matter accumulated in the hose 51 or dripper 40 may be flushed out by this initial surge of low pressure of water supply. This is the static discharge mode.

As water pressure increases, to 2 or 3 psi for example, the pressurized water pushes against the intake side of the resilient disk, and pushes it firmly against the supporting outer ring 67. The opening 60 on the resilient disk 44 allows the water to pass through to the discharge side of the resilient disk 44. Because the hole 60 size on the disk 44 is smaller than the water intake passageway diameter 55, the water pressure builds up at the intake side of the resilient disk 44. At this moment the discharge side of the resilient disk 44 is open to the atmosphere because the discharge passageway is not yet blocked. When the water pressure at the intake side of the resilient disk 44 reaches a higher pressure than the resilient disk 44 deflection rate, the resilient disk 44 starts to cave in toward the discharge side and push against the discharge sealing ring ridge 75. Before the resilient disk 44 is pushed against the discharge sealing ring ridge 75, the discharge side of the resilient disk 44 is at atmospheric pressure because it is open to the atmosphere through the outlet. After the resilient disk 44 is pushed against the discharge sealing ring ridge 75 and almost seals the discharge sealing ring ridge 75, the water continues to pass through the off-center opening 60 in the disk 44 and joins the body of water on the discharge side of the disk 44 until the water pressure exerted against the wet surface 77 of the resilient disk 44 instantly equalizes with the water pressure at the intake side. This creates a surge of energy at the discharge side of the resilient disk 44 to mark the beginning of the oscillation mode.

The sudden surge of energy or water pressure at the discharge side exerted on the wet surface area, in addition to the disk deflection rate (the disk deflection rate must be greater than the water pressure applied on the intake side at the area of discharge sealing ring ridge 75 surface) suddenly make the total energy (water pressure plus resilient disk deflection rate) at the discharge side greater than the water pressure of the intake side. This sudden change will allow the resilient disk 44 to bounce back toward its original central position and unload its tension. Suddenly the discharge side of the resilient disk 44 is open to the atmosphere, and the discharge side water pressure is instantly reduced to atmospheric pressure again. The resilient disk 44 is therefore once again being pushed toward the discharge ridge 75. This action is repeated and creates an oscillatory motion or plunging effect until the conditions change over or are below the operating parameters. The sealing ring ridge 75 is lower than the outer supporting ring 67 with the vertical distance therebetween at approximately 0.8 to 1.2 millimeters, for example.

As the water or solution pressure continues to increase past another predetermined setting, the oscillation of the disk is overcome and the disk is firmly pushed against the discharge sealing ring ridge 75. The discharge slot 57 in the ridge 75 permits a small amount of water to discharge and form drops of water. When the water pressure increases, the pressure pushes the resilient disk 44 further against the ridge 75 resulting in a reduction in the slot opening size. When the pressure decreases, the slot opening size increases. The result is a nearly constant discharge volume, making dripper 40 a pressure-compensated dripper.

The duration, the frequency, and all other performance parameters of the oscillation mode can be controlled by preset conditions. The major elements are the deflection rate of the resilient disk 44, water pressure, the hole 60 size of the resilient disk 44, the ratio of hole 60 size of the resilient disk 44 to the intake passageway 55, and the vertical distance between the supporting outer ring 67 and the discharge sealing ring ridge 75. Most important is the proportion of the wet surface 77 area to the surface area of the discharge sealing ring ridge 75. The ratio should be over 10 to 1. The narrow ridge 75 at the discharge sealing ring 62 is also an important design to provide a better sealing. If a wide sealing surface is used it may not be able to efficiently harvest the minute energy stored in the resilient disk of the drip device, the oscillation effect will be damped.

The rapid oscillations work as a plunger to automatically clean the dripper and the lines during the onset and end of drip cycles when the water pressure falls into the oscillating parameter. The resilient disk dripper has three different discharge modes based on the water pressure at the dripper. At very low pressure (for example 1 to 4 psi), the dripper operates at a static discharge mode. When pressure is higher than 4 psi the oscillation mode begins. At even higher pressures, for example 10 psi or greater, pressure compensated dripping mode starts. The window of the three cycles can be changed based on the applications. A unique feature of the present invention is that lower pressure has a higher discharge volume. This is the opposite of what occurs with conventional drippers.

In the heap leach mining application, the oscillation mode may be extended and used as the primary operating cycle during a wider low pressure range, for example 2 to 20 psi, to continuously provide self cleaning in addition to solution delivery. The ultimate advantage of using this style of dripper at low pressure is not only to save energy, but that it is constantly in a self-cleaning mode during operation. The dripper thus stands a very slight chance of becoming clogged by the heavy mineral content of the heap leach solution. The operator at the heap leach pad may also throttle the valve in the solution supply line to a lower pressure for static discharge to increase the rate of saturation of the new and old layers of the leach pads up to three times faster. An increase in production rate is the result.

Drippers may also be designed specifically for agricultural use. Since water pressure used in drip irrigation on farms generally ranges from 15 to 35 psi, for example the present design enables the resilient disk 44 to oscillate when the water pressure ranges from 2 to 7 psi. At 7 psi the oscillating speed ranges from approximately 10 to 15 cycles per second. When the water pressure is over 7 psi, the cleaning cycle ends. At this time the deflection rate of the disk will no longer be able to override the water pressure from the intake side, which pushes the disk against the sealing ridge 75, but the amount of water pressure is only equivalent to the surface area inside the concentric circle of the discharge sealing ridge 75 (does not include the wet surface 77, because the pressure at the wet surface should be equal at both sides of the disk). Then the disk 44 will press against the discharge sealing ridge and will no longer be able to rebound. The drip cycle begins.

If the dripper 40 is for home use or is used in solution mining, the water pressure is generally higher. In these cases, the parameters may be adjusted accordingly.

During the drip cycle, a plugged dripper 40 may be flushed by the use of the stopper-flushing tool or push pin 80, an embodiment of which is shown in FIG. 6. The slender end 82 of the tool 80 is adapted for insertion into the discharge passageway 66 and reaching the disk 44. By using the tool 80, the disk 44 may be pushed away from the discharge sealing ring ridge 75, the distance (length of the pin) of insertion should be set approximately half way between the discharge sealing ring ridge 75, and outer supporting ring 67 in a vertical position. The purpose of inserting a pre-manufactured round-headed pin into the discharge is to give the farmer the ability to manually unclogs the dripper on the spot with little effect, unlike conventional methods in which you have to pull the dripper out from the hose to repair or exchange it. It could tear the hole opening on an aged brittle plastic drip hose. This will shorten the life span of the drip hoses. If the irrigation water is at 35 psi after the pin is inserted at the right position, the resilient disk will oscillate approximately 40 cycles per second. This enormous energy comes from manually inserting a pin and will easily break apart any organic debris and clean any amount of debris accumulated at the discharge slot 57. When the stopper flushing tool 80 is fully inserted in position, the stopper 84 blocks the discharge, then the two sided slot opening 76 will take over the discharge function. The principal of the rapid oscillation is the same as in the dripper design, after the disk 44 has been pushed away by the push pin 80 from the discharge sealing ring ridge 75, it has to allow the resilient disk 44 to reseal (almost) the ridge 75, and reopen it in a fraction of a second. If the pin is inserted too far and beyond a certain limit, the disk is not able to seal (almost) the discharge sealing ring ridge 75. The oscillation will then stop immediately.

When the pin 80 is used at a higher water pressure, more force is required to push the disk 44 away from the discharge sealing ring ridge 75. This further stretches the resilient disk 44 and extends its elastic tension, thus adding to the deflection energy which causes the rapid oscillation. A higher deflection rate with higher water pressure will have a higher oscillation frequency. If the disk 44 is made from a full hard metal (such as spring steel) it will not be able to stretch by pushing, and this result will not occur. The resilient disk oscillates due to pressure fluctuations between intake and discharge sides. The pressure builds and pushes the disk back before the disk can physically engage any hard surface. In principle and in lab tests the disk oscillates at a high speed without damage. In industrial application, a larger (for example 8" in diameter) metal spring steel disk may also be used with a higher deflection rate (for example 40 psi). With high pressure (for example 200 psi) water supplies, the pressure fluctuations between the intake and discharge sides can reach hundreds of pounds. The metal disk thus oscillates thousands of cycles per second, creating shock waves and mechanical vibrations which can be useful for cleaning, emulsifying, and mixing. This method can also be used as a mechanical vibrator and for many other purposes. The principle and construction of the industrial version of the resilient disk device is the same as the dripper. The only difference is that the discharge slot 57 can be eliminated, and the shape of the intake and discharge connection also can be changed based on the application.

The dripper 40 has the same general configuration, principle, and uses the same method as the end flush 10. Because the end flush 10 is inserted at the end of the drip hose 51, and the dripper 40 is inserted through the side of the drip hose, the appearance is quite different. The dripper 40 requires a longer duration of oscillation for a greater cleaning effect than the end flush 10, because of that, the set up is slightly different, but the principle and process method are the same. The end flush 10 requires a greater volume of water and larger debris are able to go through it then the dripper, because of that it uses a larger discharge slot opening 28 (2.5×2.5 millimeter) at the supporting ring 26, instead of using a smaller hole opening 60 (approximately 1.2 millimeter in diameter) in the disk 44. The end flush 10 has no drip cycle, the slot opening in the sealing ring 30 is also not needed.

Figure 7:
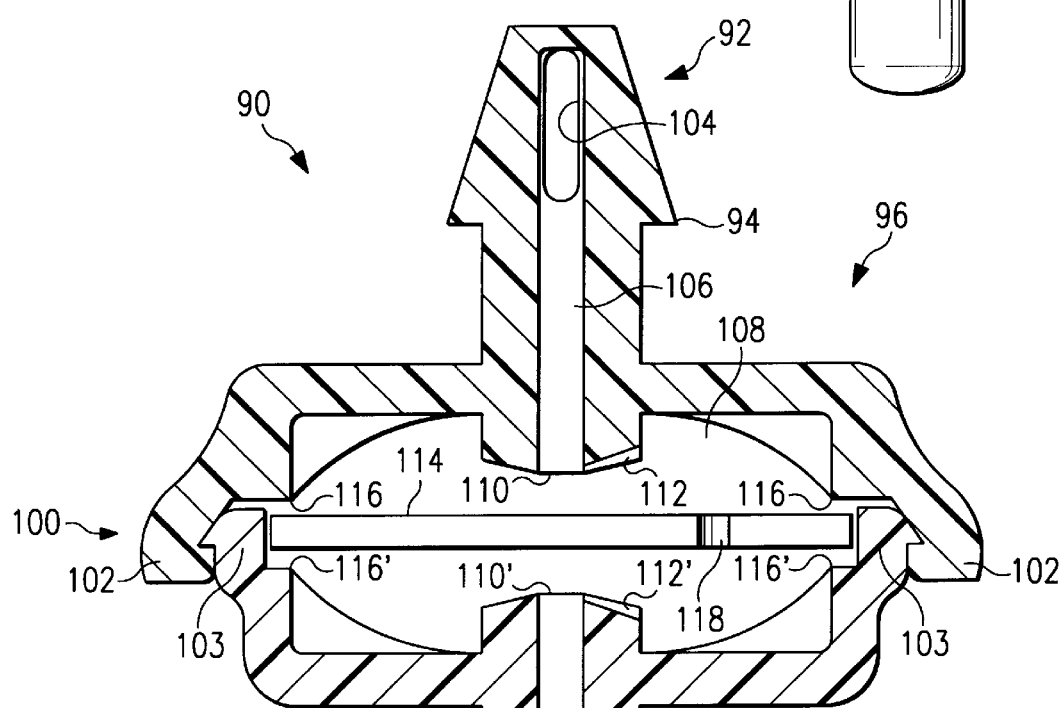
FIG. 7 is a cross-sectional view of a two-headed dripper.

Referring to FIG. 7, a two-headed resilient disk drip irrigation device 90 is shown. Two-headed dripper 90 has two "heads" 92 and 92', both capable of being inserted into a pre-drilled opening made in a hose (not shown). Both heads 92 and 92' include anchoring barbs 94 and 94' to securely anchor against the inside wall of the hose. The dripper 90 are constructed of two half portions 96 and 98, which are securely fastened together by a clamping structure 100, including clamp 102 and mating clamp 103 formed in the half portions 96 and 98, respectively.

Both heads 92 and 92' define side openings 104 and 104' (one on each side of the passageway) connected to a water passageway 106 and 106' which lead into a water chamber 108 formed between the two half portions 96 and 98. The water passageways 106 and 106' protrude a predetermined distance into the water chamber 108 and form a sealing ridge 110 and 110' around the mouth of the water passageways 106 and 106' at the point the water in the passageway 106 and 106' enter into the chamber 108 or exit from the chamber 108. A slot 112 and 112' is formed in the sealing ridge 110 and 110', respectively.

A disk 114 is housed in the chamber 108 with its outer edge positioned between supporting outer rings 116 and 116' in the two half portions 96 and 98, respectively.

The material used to construct the two-headed dripper 90 is like that described above in the end flush 10 and dripper 40 embodiments. The two-headed dripper 90 also operate in a similar manner. However, because it effectively has two inlets and two discharge outlets, if the dripper 90 is blocked by larger particles that cannot be flushed out, the two-headed dripper 90 may simply be reversed by pulling the dripper from the hose and reinserting the other "head" into the hose. The opposite side of the discharge is a separate identical portion of the unit it should be free from being plugged up. The debris and particle blocking the dripper 90 are then easily flushed out with the reversed direction of the water therethrough. Therefore, the two-headed dripper 90 can always be cleared out and unplugged by reversing the intake and the outlet.

Furthermore, the slots 112 and 112' on the sealing ridge 110 and 110' may be sized differently so that the discharge volumes of the two sides are different. For example, the slot opening 112 may discharge half a gallon per hour and the slot opening 112' may discharge one gallon per hour when used as the discharge. The dual discharge rates makes the two-headed dripper 90 ideal for home use and contractors and reduces inventory at the retail level.

Figure 8:
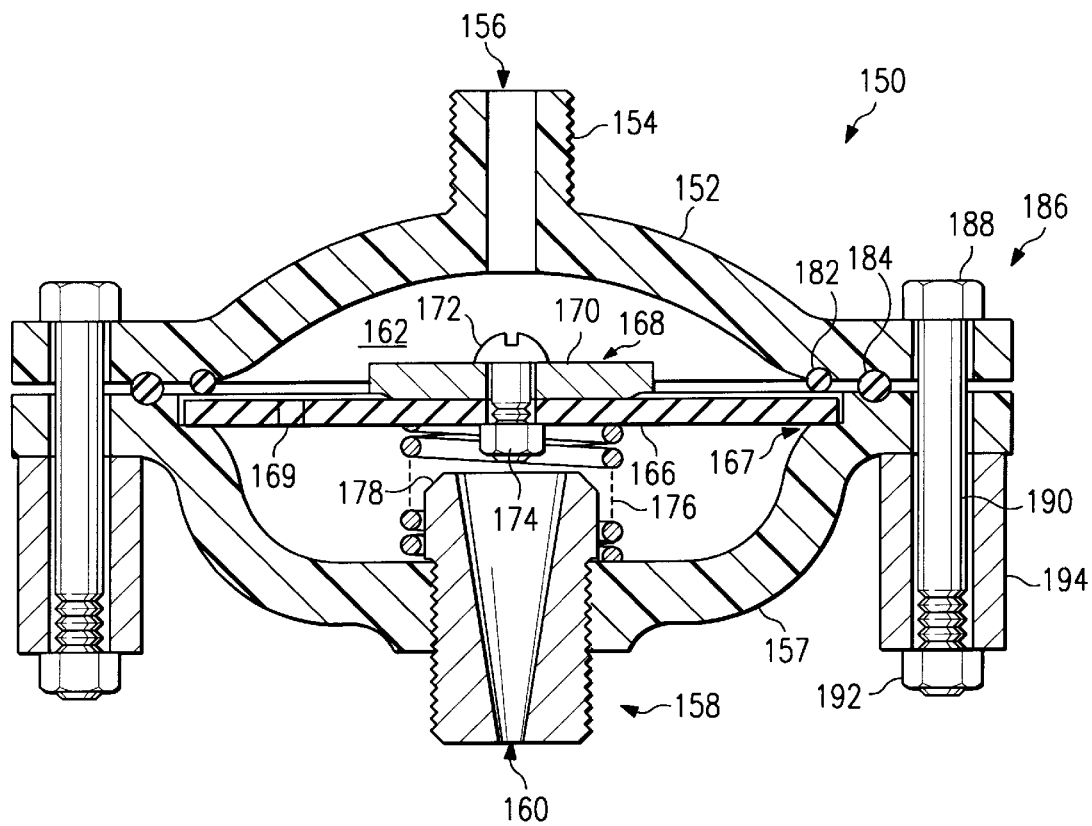
FIG. 8 is a cross-sectional view of an embodiment of an industrial oscillating disk dripper device according to the teachings of the present invention.

Referring to FIG. 8, an exemplary embodiment of a industrial device 150 constructed according to the teaching of the present invention with an industrial application is shown. Industrial device 150 includes an upper body portion 152 with an intake shank 154 and an intake passageway 156, and a lower body portion 157 with a discharge shank 158 and a discharge passageway 160. Upper and lower body portions 152 and 157 define an inner chamber 162. Discharge shank 158 may include a portion that protrudes into chamber 162 forming a discharge ridge 178.

Figure 9A:
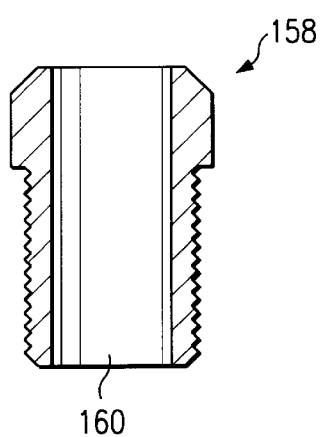
FIGS. 9A–9C are cross-sectional views of three exemplary embodiments of the discharge outlet.
Figure 9C:
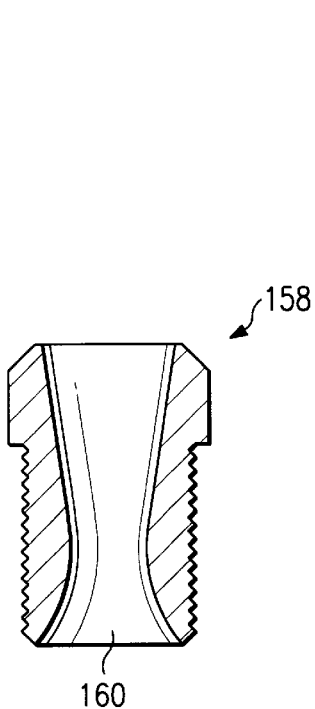
Figure 9B:
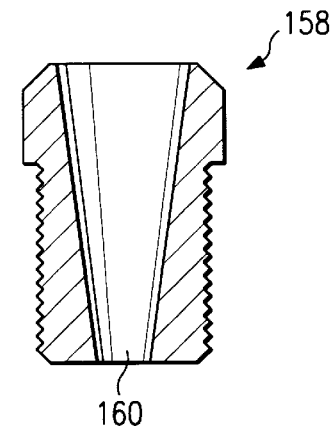

In one embodiment of the present invention, as shown in FIG. 8, intake shank 154 is formed integral with upper body portion, and discharge shank 158 is a separate component that may be installed and interchanged according to the desired discharge velocity of various applications. A number of interchangeable discharge shanks 158 with various exemplary passageway configurations 160 are shown in FIGS. 9A–9C. The discharge passageway in FIG. 9A is cylindrical with no variation in width. The discharge passageway in FIG. 9B defines a narrowing waist with a flared-out discharge outlet nozzle. The discharge passageway in FIG. 9C defines a conical configuration. It is contemplated by the present invention that other discharge passageway configurations may be utilized herein without departing from the teachings of the present invention. Further shown is the threading provided on the outer surfaces of intake shank 154 and discharge shank 158 to facilitate the installation of liquid conduits thereon.

Lower body portion 157 includes a shallow shelf 167 to accommodate a disk 166. Disk 166 may be formed of a resilient material, such as those described above, or it may be formed of a metal or a substantially rigid composite material. Disk 166 includes one or more openings 169 which may be positioned therein in a predetermined pattern. The number of openings 169 and the pattern they are positioned in may be determined by the industrial application and the discharge or oscillating requirements therefor. Disk 166 is fastened to a reinforcing assembly 168, including a reinforcing plate 170 secured to disk 166 by a fastener such as a bolt 172 and a nut 174. Disk 166 and reinforcing assembly 168 rest against a spring assembly 176, which is generally positioned about protruding portion 178 of discharge shank 158.

One or more sealing O ring 182 and 184 may be provided at the interface between upper and lower body portions 152 and 157 to ensure a tight and secure fit between upper and lower body portions 152 and 157 and to further secure disk 166 in place.

Upper and lower body portions 152 and 157 may be secured together with fastening assemblies 186, which may include a bolt 188 fastened through openings made in a flange portion formed in both upper and lower body portions 152 and 157. A nut 192 is fastened to the bolt shank 194 and a mounting bracket 194 to secure upper and lower body portions 152 and 157 together and to secure industrial device 150 to mounting bracket 194. Mounting bracket 194 may be used to mount industrial device 150, such as to a tank containing cleaning solvents for industrial cleaning applications.

In operation, during beginning of each operating cycle, water or a solution enters industrial device 150 through intake passageway 156. The initial water pressure is insufficient to push disk 166 against spring assembly 176 and discharge ridge 178, and thus the solution flows freely through one or more openings 169 in disk 166 to the discharge side of disk 166 and out of discharge passageway 160.

As water pressure entering chamber 162 increases, it can go up to a few hundreds of pounds per square inch, for example, the pressurized solution pushes against the intake side of disk 166, and pushes it against spring assembly 176. Disk opening 169 still allows the solution to pass through to the discharge side of disk 166. However, because the opening size (or total sizes) is smaller than the intake passageway diameter, the water pressure builds up at the intake side of disk 166. At this moment the discharge side of disk 166 is open to the atmosphere because the discharge passageway is not yet blocked. When the water pressure at the intake side of disk 166 reaches a higher pressure than the combined deflection rate of disk 166 and spring assembly 176, disk 166 begins to be pushed against discharge ridge 178. After disk 166 is pushed against discharge ridge 178 and almost seals off discharge passageway 160, the water or solution continues to pass through the one or more openings 169 in disk 166 and joins the body of water in chamber 162 on the discharge side of disk 166 until the water pressure exerted against the wet surface of disk 166 instantly equalizes with the water pressure at the intake side. This creates a surge of energy which could be up to several hundreds pounds at the discharge side of disk 166 to mark the beginning of the oscillation mode of operations.

The sudden surge of energy or water pressure at the discharge side exerted on the wet surface area, in addition to the disk and spring deflection rate suddenly make the total energy (water pressure plus resilient disk and spring deflection rate) at the discharge side greater than the water pressure at the intake side. This sudden change allows disk 166 and spring assembly 176 to bounce back toward its original central position and unload its tension. Suddenly the discharge side of disk 166 is open to the atmosphere, and the discharge side water pressure is instantly reduced to atmospheric pressure again. Disk 166 is therefore once again being pushed toward discharge ridge 178. This repetitive action creates an oscillatory motion or plunging effect in disk 166.

In the heap leach mining application, this oscillation mode of operation may be used as the primary operating cycle during a wider pressure range continuously provide self cleaning in addition to solution delivery. The ultimate advantage of using this style of dripper at low pressure is not only to save energy, but that it is constantly in a self-cleaning mode during operation. The dripper thus stands a very slight chance of becoming clogged by the heavy mineral content of the heap leach solution. The operator at the heap leach pad may also throttle the valve in the solution supply line to a lower pressure for static discharge to increase the rate of saturation of the new and old layers of the leach pads up to three times faster. An increase in production rate is the result.

With high pressure (for example 200 psi) water supplies, the pressure fluctuations between the intake and discharge sides of disk 166 can reach hundreds of pounds. Disk 166 thus may oscillate thousands of cycles per second, which creates shock waves and mechanical vibrations that can be used for cleaning, emulsifying, and mixing when installed in a tank. Dripper device 150 can also be used as a mechanical vibrator and many other purposes.

Although the present invention has been described in detail, it should be understood that various changes, substitutions and alterations can be made thereto without departing from the spirit and scope of the present invention as defined by the appended claims.

What is claimed is:

1. An oscillating disk device, comprising:
   an upper body portion having a generally elongated inlet having an intake passageway defined therein and at least one inlet opening;
   a lower body portion being coupled with said upper body portion and having a discharge outlet, the discharge outlet defining a discharge passageway;
   a chamber formed by the upper and lower body portions in fluid-connection with the intake and discharge passageways; and
   a free-floating disk defining at least one opening therein and being positioned in the chamber between said upper and lower body portions, outer edges of said disk being supported by a shelf formed in the lower body portion, said disk having an intake side and a discharge side, said disk being adapted to oscillate at a predetermined frequency between a first substantially neutral position and a second position substantially obstructing a discharge opening leading to the discharge passageway when the intake water pressures reaches a predetermined range.

2. The oscillating disk device, as set forth in claim 1, further comprising a reinforcing assembly fastened to the disk.

3. The oscillating disk device, as set forth in claim 1, further comprising:
   a reinforcing plate; and
   a fastener securing the reinforcing plate to substantially the center of the intake side of the disk.

4. The oscillating disk device, as set forth in claim 3, wherein the reinforcing plate is circular.

5. The oscillating disk device, as set forth in claim 1, further comprising a spring assembly positioned between the disk and the discharge opening.

6. The oscillating disk device, as set forth in claim 1, wherein the inlet is formed integral with the upper body portion.

7. The oscillating disk device, as set forth in claim 1, wherein the discharge outlet is decouple-able from the lower body portion.

8. The oscillating disk device, as set forth in claim 1, further comprising a fastening assembly securing the upper and lower body portions together.

9. The oscillating disk device, as set forth in claim 1, further comprising an O ring positioned between the upper and lower body portions to ensure a tight fit therebetween.

10. The oscillating disk device, as set forth in claim 1, further comprising an O ring positioned between the upper and lower body portions to guard against unwanted disk displacement.

11. The oscillating disk device, as set forth in claim 1, further comprising a helical spring coiled about the protruding portion of the discharge outlet and discharge opening operable to provide a biasing force on the disk against the intake water pressure.

12. An oscillating disk device for creating mechanical vibrations at a low to medium frequency, comprising:

an upper body portion having an inlet having an intake passageway leading into an intake chamber defined within the upper body portion;

a lower body portion coupled to the upper body portion and defining a discharge chamber therein, the lower body portion further having a discharge outlet defining a discharge passageway leading from the discharge chamber;

a disk reinforced by a plate being positioned, at an interface between the intake and discharge chambers and between the upper and lower body portions, the disk having outer edges supported by a shelf defined at the intake and discharge chamber interface;

a biasing assembly positioned between the disk and the discharge opening operable to bias the disk against an intake water pressure present in the intake chamber; and the disk being adapted for oscillating between a first substantially neutral position and a second position momentarily sealing the discharge opening at a predetermined pressure range of the intake water supply.

13. The oscillating disk device, as set forth in claim 12, wherein the discharge outlet is decouple-able from the lower body portion.

14. The oscillating disk device, as set forth in claim 12, further comprising a fastening assembly securing the upper and lower body portions together.

15. The oscillating disk device, as set forth in claim 12, further comprising an O ring positioned between the upper and lower body portions to ensure a tight fit therebetween.

16. The oscillating disk device, as set forth in claim 12, further comprising an O ring positioned between the upper and lower body portions to guard against unwanted disk displacement.

17. A method for creating a repetitive mechanical vibration at a predetermined low to medium frequency, comprising the steps of:

providing a source for a liquid solution into an inlet of an oscillating disk device, the inlet defining an intake passageway leading into a chamber of the oscillating disk device;

providing the liquid solution or water at a predetermined water pressure entering the intake passageway and chamber, and permitting the liquid solution or water to flow through at least one opening defined in a free-floating disk positioned in the chamber, the disk having an intake side and a discharge side;

increasing the water pressure passing through the intake passageway and pushing the disk against a discharge opening protruding into the chamber leading out to a discharge passageway;

continuing to permit liquid solution to flow through the at least one opening in the disk so that the discharge side water pressure instantly equalizes with the intake side water pressure thus the sudden surge of energy at discharge side allows the disk to return to its neutral position spaced from the discharge opening; and again permitting the disk to be pushed against the discharge opening by the intake water pressure, causing a continuous oscillating motion in the disk thereby creating a repetitive mechanical vibration.

18. The method, as set forth in claim 17, further comprising the step of biasing the disk against the intake water pressure and thereby providing additional mechanical force to aid the disk to return to its neutral position.

19. A method for heap leach mining, comprising the steps of:

installing an inlet of a dripper into a hose, the inlet defining an intake passageway;

providing a leach solution in said hose, the leach solution entering the intake passageway and a chamber housing a disk being supported by an outer support shelf, the disk having an intake side and a discharge side;

permitting the leach solution to flow through at least one opening defined in the disk and flushing debris accumulated in the dripper out through a discharge passageway;

increasing the leach solution pressure at the intake side of the disk to a first predetermined range and causing the disk to deflect and be pushed against a discharge opening positioned in the chamber at an entrance of the discharge passageway;

continuing to permit the leach solution to flow through the at least one opening in the disk and attaining a discharge side water pressure instantly equalizing with the intake side water pressure;

permitting the disk to harvest the energy stored in its deflected form and the increased water pressure at the discharge side and suddenly rebound away from the discharge opening and substantially back to its neutral position and opening the discharge passageway to atmospheric pressure;

again permitting the disk to deflect and be pushed against the discharge opening by incoming leach solution, causing a continuous oscillating motion in the disk thereby loosening any accumulated debris lodged in the dripper and flushing the debris out through the discharge passageway; and continuing to operate the dripper within the predetermined leach solution pressure to sustain the disk oscillation for continued self-cleaning and delivery of the leach solution to a heap pad.

20. A method for creating oscillatory motions for industrial applications, comprising the steps of:

installing an inlet of an oscillating disk device into a liquid supply line, the inlet defining an intake passageway;

providing pressurized liquid in the supply line, the pressurized liquid entering the intake passageway and a chamber housing a disk being supported by an outer support shelf, the chamber having an intake side and a discharge side;

permitting a first volume of the pressurized liquid to flow into the intake side of the chamber and a second smaller volume of water to flow through an at least one opening in the disk to the discharge side of the chamber, causing a sudden pressure buildup on the intake side of the chamber over the deflection rate of the disk and a biasing assembly and further causing the disk to deflect and butt up against a discharge opening positioned in the chamber at an entrance of a discharge passageway, substantially sealing off the discharge opening;

permitting the pressurized liquid to flow through the at least one opening in the disk and allowing the pressure at the discharge side of the chamber and the mechanical force in the biasing assembly to instantly overtake the pressure of the intake side of the chamber, permitting the disk to suddenly rebound away from the discharge opening and return back to their neutral positions, and further opening the discharge passageway to atmospheric pressure again;

again permitting said disk to deflect and be pushed against the biasing assembly and the discharge opening by incoming pressurized liquid, thus creating an oscillatory motion in the disk.

21. An oscillating disk device, comprising:

a housing forming a water chamber in fluid connection with an inlet and a discharge outlet, the inlet defining an intake passageway and the discharge outlet defining a discharge passageway; and a free-floating disk defining at least one opening therein and being positioned in the water chamber, outer edges of the disk being supported by a shelf formed in the lower body portion, the disk having an intake side and a discharge side, the disk being adapted to oscillate at a predetermined frequency between a first substantially neutral position and a second position substantially obstructing a discharge opening leading to the discharge passageway when the intake water pressures reaches a predetermined range.

* * * * *

UNITED STATES PATENT AND TRADEMARK OFFICE
CERTIFICATE OF CORRECTION

PATENT NO : 6,085,986
DATED : July 11, 2000
INVENTOR(S) : Michael Yu

It is certified that error appears in the above-identified patent and that said Letters Patent are hereby corrected as shown below:

On title page, item [54] OSCILLATING DISK DRIVES
replace "DRIVES" with --DEVICES--.

Signed and Sealed this

Twenty-second Day of May, 2001

Attest:

NICHOLAS P. GODICI

Attesting Officer     Acting Director of the United States Patent and Trademark Office